US012106280B1

(12) United States Patent
Constantin et al.

(10) Patent No.: US 12,106,280 B1
(45) Date of Patent: Oct. 1, 2024

(54) ACCOUNTING EVENT PROCESS OPTIMIZATION FOR MULTI-TENANT SYSTEMS

(71) Applicant: Amazon Technologies, Inc., Seattle, WA (US)

(72) Inventors: Catalin Constantin, Seattle, WA (US); Jie Chen, Seattle, WA (US); Shobhit Sinha, Noida (IN); Subhas Chandra Dey, Redmond, WA (US); Manish Lonial, Vancouver, WA (US); Michael Kearney, Seattle, WA (US); Christopher Duff, Maple Valley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/543,082

(22) Filed: Dec. 6, 2021

(51) Int. Cl.
*G06Q 30/00* (2023.01)
*G06Q 20/22* (2012.01)
*G06Q 20/24* (2012.01)
*G06Q 20/26* (2012.01)
*G06Q 20/40* (2012.01)

(52) U.S. Cl.
CPC ........... *G06Q 20/227* (2013.01); *G06Q 20/24* (2013.01); *G06Q 20/26* (2013.01); *G06Q 20/405* (2013.01)

(58) Field of Classification Search
CPC .................................................. G06Q 20/227

USPC ......... 705/39, 1.1, 30, 35, 40, 14.27, 34, 44; 455/405, 410, 420
See application file for complete search history.

(56) References Cited

U.S. PATENT DOCUMENTS

2015/0088707 A1* 3/2015 Drury ................... G06Q 40/12
705/30
2021/0127436 A1* 4/2021 Smets ................... H04W 76/12

OTHER PUBLICATIONS

ProQuestDialogNPL Search History.*

* cited by examiner

*Primary Examiner* — John H. Holly
(74) *Attorney, Agent, or Firm* — BakerHostetler

(57) ABSTRACT

Implementations for providing event processing services for a plurality of services are described. An example method may comprise receiving, by a payment processing service, data indicative of a payment event associated with an ordering service. The method may comprise causing, based on an accounting rule specific to a payment option associated with the payment event, a first entry associated with a handover account and the payment event to be added to a data store. The method may comprise sending, to the ordering service, handover information indicating the handover account and the payment event. The ordering service may cause, based on the handover information, a second entry associated with the handover account and the payment event to be added to the data store. The handover account may facilitate satisfying accounting rules for payment events without the ordering service having to manage satisfaction of the accounting rules.

18 Claims, 10 Drawing Sheets

```
AccountingBooking:
  type: object
  description: |
    The Accounting Booking processed for an financially significant event.
  properties:
    id:
      type: string
      description: |
        The unique identifier of the Accounting Booking.
    client_id:
      type: string
      description: |
        Filter AccountingBooking sources that were created by given client Id.
    idempotency_key:
      type: string
      description: |
        A key that uniquely tags the service request.
    client_reference:
      type: string
      description: |
        Reference provided and used by client.
    financially_significant_event_idempotence_version:
      type: string
      description: |
        financially_significant_event idempotence version determined by Payments accounting service (PAAS).
    financially_significant_event_id:
      type: string
      description: |
        Id of associated financially significant event.
    payment_method_accounting_class:
      $ref: '#/components/schemas/PaymentMethodAccountingClass'
      description: |
        Refer to PaymentMethodAccountingClass for documentation.
    booking_sequence:
      $ref: '#/components/schemas/AccountingBookingSequence'
      description: |
        Refer to AccountingBookingSequence for documentation.
    category:
      $ref: '#/components/schemas/FinanciallySignificantEventBookingCategory'
      description: |
        Refer to FulfillmentAccountingBookingCategory.
    creation_time:
      type: string
      format: date-time
      example: '2017-01-19T00:38:38.962Z'
      description: |
        The date & time when PaymentMethodChargeAccountingBooking is created.
    last_update_time:
      type: string
      format: date-time
      example: '2017-01-19T00:38:38.962Z'
      description: |
        The date & time when PaymentMethodChargeAccountingBooking is last updated.
    status:
      $ref: '#/components/schemas/AccountingBookingStatus'
      description: |
        The status of the Accounting Booking.
```

FIG. 3B

```
AccountingBookingSequence:
  type: string
  description: |
    Category representing the sequence of the accounting significant event.

Value                                          | Description
    ---------------------------------------------- | -----------
    FirstPurchaseLevelAccountingSignificantEvent | This is the first payments accounting significant event of the purchase. Typically used to convey if the settlement has happened before Fulfillment or vice versa.
  enum:
    - FirstPurchaseLevelAccountingSignificantEvent AccountingBookingStatus:
  type: string
  description: |
    Status of the Accounting Booking.

Value                     | Description
    ------------------------- | -----------
    Pending                   | The booking has been pending.
    Successful                | The booking has been completed.
    Error                     | The booking has encountered an error.
  enum:
    - Pending
    - Successful
    - Error FinanciallySignificantEventBookingCategory:
  type: string
  description: |
    Category representing Fulfillment Accounting Booking category Value                  | Description
    ---------------------- | -----------
    FulfillmentCompleted   | Fulfilment has been completed from Amazon and delivery is on the way. It can map to ShipComplete events in Ordering and Fulfillment events in Digital.
    Delivered              | Items have been delivered to the customer. This can be mapped to shipment last touch event of the ordering.
    SettleConfirmation     | Confirmation of settlement approval.
  enum:
    - FulfillmentCompleted
    - Delivered
    - SettleConfirmation
```

FIG. 3C

ACCOUNTING EVENT PROCESS OPTIMIZATION FOR MULTI-TENANT SYSTEMS

BACKGROUND

Traditional settlement systems are not scalable for the business models in the industry today where one system is delegated with payments responsibilities. For example, an entity may provide a multi-tenants payment systems which serve different kinds of businesses (M) and kinds of payment methods (N) at a global scale. In such business models, typical process to handle payments accounting creates a complexity of O(M*N) as accounting entries vary with business, payment methods and marketplace. Thus, improvements are needed to more efficiently provide payment accounting systems.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3B shows an example input and output type of a createAccountingBooking API in YAML format.

FIG. 3C shows example accounting booking sequence information.

DETAILED DESCRIPTION

Disclosed herein are techniques for processing events, such as payment events (e.g., or accounting events), for a plurality of ordering services (e.g., associated with business entities). Disclosed is a service configured to decrease payment method complexity for the plurality of ordering services. Complexity may be reduced by breaking up accounting significant events and allowing them to flow independently to accounting systems, relying on the match-and-clear process to reconcile both the entries. In conventional payment event systems, business events may be coupled with payment events such that each ordering service of a plurality of ordering services using the system separately creates unique accounting mapping for each of a plurality of individual payment method. The disclosed techniques improve upon this approach by changing from individual account mappings for each payment option (e.g., payment method) to grouping each payment option to a set of accounting mappings based on when cash is received/guaranteed. These account mappings may be applied to all ordering services using the account event system. This approach allows for a multi-tenant accounting system to decouple individual entities from payments accounting.

The impact of this decoupling may be quite significant. For example, if a new payment option becomes supported, each individual ordering service typically must support significant changes to update their account systems to meet new protocols and regulations associated with the payment option. With the disclosed payment event processing services, this significant work by the ordering service is substantially reduced because important updates to support the new payment option may be performed centrally, even when the centralized service is not a business entity itself capable of having accounts to receive payments. As an estimation, the end-end cost reduction for accounting is about 15 calendar weeks per payment method expansion per business, cumulatively saving estimated calendar time of 11250 calendar weeks for the typical parity gaps seen in any business for payments scaling.

The simplification may be achieved via new application programming interfaces (APIs) in a payment processing service (e.g., or event processing service) that will provide a uniform interaction pattern for ordering services that manage the acceptance of consideration for revenue generating activities on behalf of a variety of billing systems. The payment processing service may be a service that interact with payment systems for all clients (e.g., or entities) of a multiple tenant account event processing system. With the decoupled architecture proposed herein, payment option expansion may be provided to different ordering services with an effort reduction from 20 Dev Weeks to 1 Day for accounting changes and user acceptance testing for business expansion.

Figure 1:
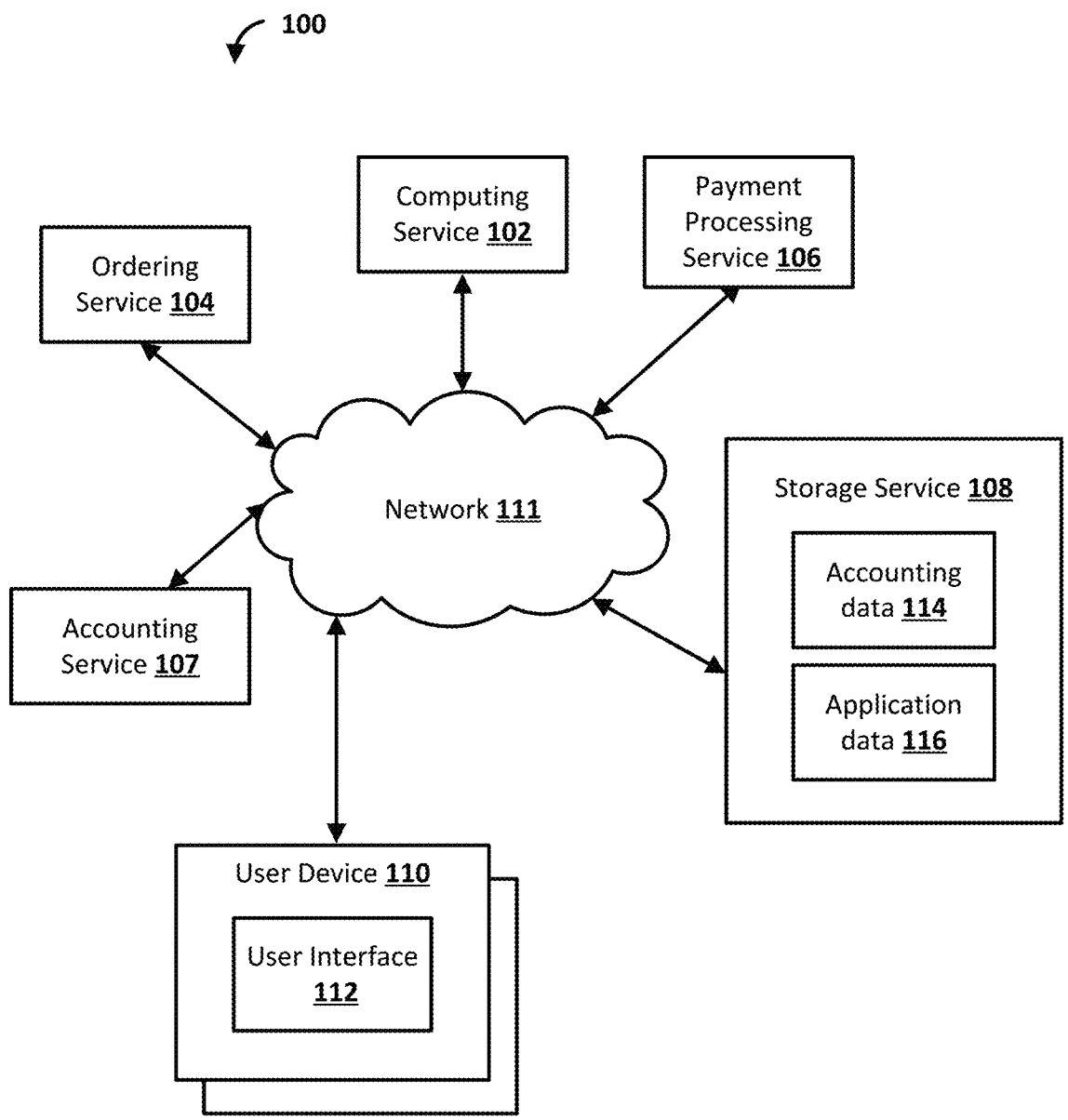
FIG. 1 is a diagram illustrating an example computing system for processing events.

FIG. 1 is a diagram illustrating an example computing system 100 for providing one or more services. The one or more services may comprise a computing service 102, an ordering service 104, a payment processing service 106, an accounting service 107, a storage service 108, or a combination thereof. The one or more services may be accessible via a services user interface, such as a web-based services user interface. The services user interface may allow users to configure, sign-up, manage, and/or the like the one or more services. The services user interface may be configured to allow association and/or integration of one service with another. The one or more services and/or the services user interface may be managed by a services entity, such as a services provider. The one or more services may comprise network-based services that are geographically dispersed (e.g., external to user premises). The one or more services may be provided to one or more user devices 110.

The system 100 comprises a network 111. The network 111 is configured to communicatively couple one or more of the computing service 102, the ordering service 104, the payment processing service 106, the storage service 108, the user device 110, and/or the like. The network 111 may also comprise a plurality of network devices, such as routers, switches, access points, switches, hubs, repeaters, modems, gateways, and/or the like. The network 111 may comprise wireless links, wired links, a combination thereof, and/or the like.

The one or more user devices 110 comprise a computing device, such as a mobile device, a smart device (e.g., smart watch, smart glasses, smart phone), a computing station, a laptop, a workstation, a tablet device, and/or the like. In embodiments, the one or more user devices 110 are configured to output one or more user interfaces 112, such as a user interface associated with the computing service 102, a user interface associated with the ordering service 104, a user interface associated with the payment processing service 106, a user interface associated with the accounting service 107, a user interface associated with the storage service 108, and/or the like. The one or more user interfaces are output by an application, such as desktop application, a mobile application, a browser application, a content browser, a web browser, and/or the like.

Figure 7:
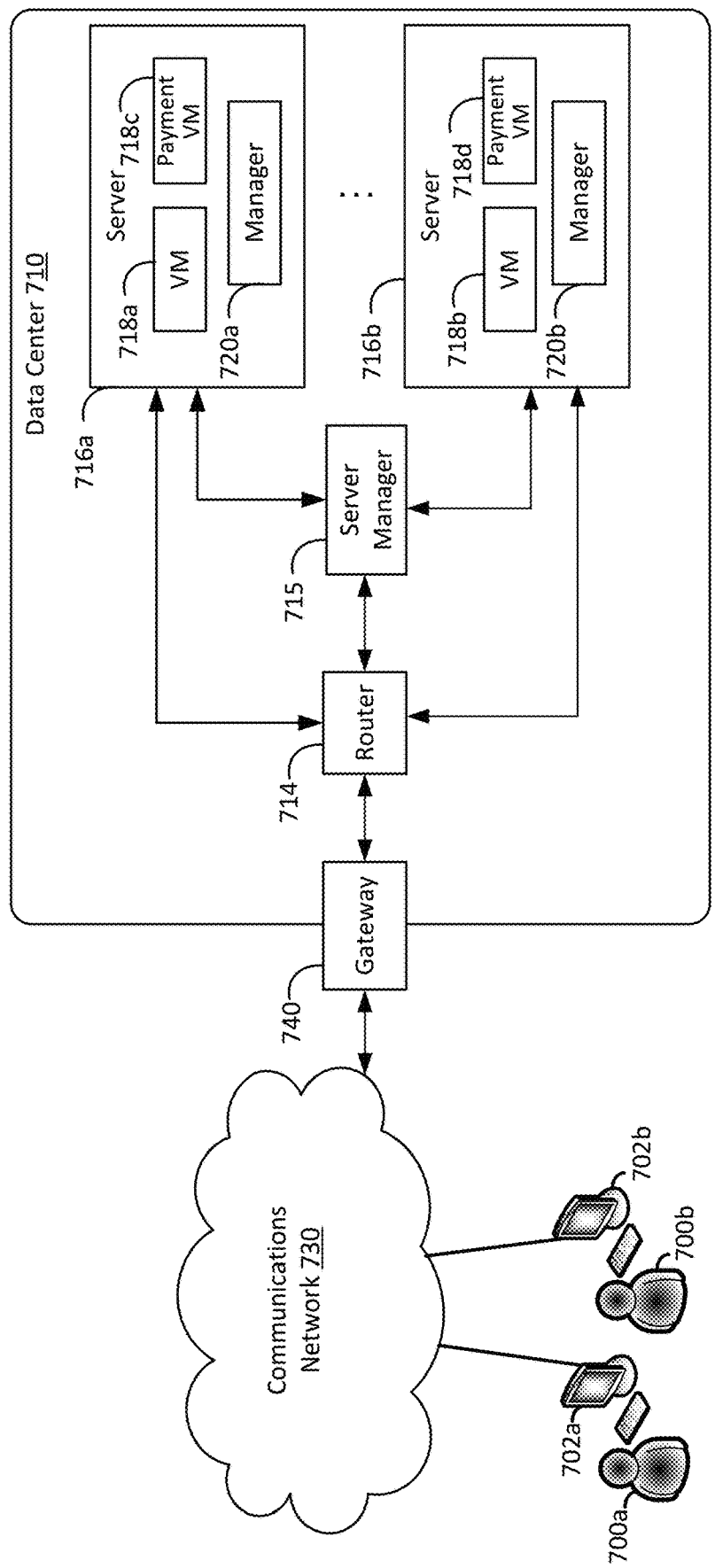
FIG. 7 is a diagram illustrating an example computing system that may be used in some embodiments.

The computing service 102 is configured to provide one or more computing nodes, such as computer processors, virtual machines, computing devices, and/or the like. The computer service 102 may be implemented as shown in FIG. 7, using one or more virtual machines, servers, and/or the like. The computing service 102 may be used to implement a variety of services, such as any of the one or more services, an event processing service, a transaction accounting service, a payment processing service, a web hosting service, a database service, cloud computing services, analytic services, blockchain services, application programming interface services, developer services, machine learning services, security services, serverless hosting, business application services, gaming services, content services, and/or the like. The computing service 102 may be configured to implement the ordering service 104, payment processing service 106, the accounting service 107, the storage service 108, or a combination thereof.

The storage service 108 is configured to store accounting data 114. The accounting data 114 comprises data indicative of events generated by the one or more services. The events may comprise settlement events, payment events, accounting events, fulfilment events, and/or the like. The accounting data 114 may be generated based on the one or more services. The events may be generated based on monitoring for events, requests received by the services, actions performed by the one or more services, and/or the like. The events may be events from one or more service logs, data streams, and/or the like. In embodiments, the accounting data 114 comprises events associated with the ordering service 104. It should be appreciated that though only one ordering service 104 is shown, it is contemplated that a plurality of ordering services 104 may be implemented. The ordering service 104 is a service that provides an application for ordering products, providing payments, providing fulfilment of purchases, and/or the like. The application may comprise a web-application. The ordering service 104 may be an application hosted on a serverless web hosting service (e.g., the web server software is managed on behalf a user). A service provider and/or a user may upload the application to the storage service 108 as application data 116 (e.g., application code sets, application packages). The ordering service 104 provides the application based on the application data 116.

The payment processing service 106 is configured to process payment events (e.g., settlement events, fulfillment events) associated with one or more of the services, such as the ordering service 104. The payment processing service 106 may be configured to process events according to the techniques disclosed herein. The payment processing service 106 and/or the ordering service 104 may be configured to cause the accounting service 107 to add entries to the accounting data 114 (e.g., as part of a database, ledger, booking). The payment processing service 106 and/or the ordering service 104 may be configured to use a handover account to facilitate processing of events as disclosed herein.

The payment processing service 106 may receive data indicative of a payment event (e.g., settlement event, accounting event, fulfilment event) associated with the ordering service 104. The payment processing service 106 may facilitate payment with a plurality of accounts of the ordering service 104 without using an intermediate account to receive funds associated with the payments.

The ordering service 104 may be one of a plurality of ordering services. At least one of the plurality of ordering services may be an external service (e.g., associated with a third party, associated with an entity different than the entity that controls the payment processing service 106). In some scenarios, at least a portion (or all) of the plurality of ordering services be services that are internal services (e.g., controlled by a single entity, such as via a plurality of sub-entities). Each ordering service 104 may be associated with a corresponding service entity, ordering entity, business entity, application, and/or the like.

The payment processing service 106 may process the received data indicative of the payment event. The payment processing service 106 may access, manage, store, and/or the like a plurality of accounting rules. The plurality of accounting rules may be used to process the payment event. Each accounting rule is a logical rule in a computer readable language stored as data on one or more computing nodes. Each accounting rule may correspond with a payment option (e.g., payment method, credit card, pay later, gift card). For example, a payment option may have requirements, such as regulations, legal requirements, data requirements, and/or the like, associated with the payment option. An accounting rule may indicate specific entries to add to the accounting data 114 if the payment option is used for a payment. An accounting rule may indicate specific data categories (e.g., types of information), data values (e.g., values for the categories/types of information), and/or the like to add to one or more corresponding entries in the data store.

The payment processing service 106 may determine, based on the payment option associated with a payment event, a handover account from the plurality of handover accounts to use to process the payment event. The handover account may be one of a plurality of handover accounts. Each handover account of the plurality of handover accounts may correspond to a payment category associated with a plurality of payment options. The plurality of handover accounts may comprise a first handover account corresponding to a cash receiving payment category, a second handover account corresponding to a pay later payment category, a third handover account corresponding to a stored value payment category, a combination thereof, and/or the like.

The cash receiving category may comprise include payment methods that deducts cash from the customer's account of an external financial institution like banks, on the invocation of charge (e.g., credit card).

The stored value category may include payment methods representing customer account balance internal to a company and/or service provider. Examples include gift cards and loyalty points. A customer pays cash in advance to buy the stored value. The charge deducts the balance from the internal accounts. This may not include the payment methods that are stored value based for the customer but stored value is managed externally.

The pay later (e.g., or invoicing) category may include charges that do not create any actual money movement but rather generate an invoice (e.g., in-house installment). The customer is expected to pay against the invoice within a stipulated time outside of the charge flow: Invoice risk is owed by the company. This may not include the payment methods that are invoice based for the customer but invoice is managed externally (e.g., line of credit)

Any relevant accounting rules (e.g., one associated with a payment option of the payment event) may be used to determine which accounting entries to add to the accounting data 114 and/or what information to add to the determined handover account. An accounting rule may indicate to add to the accounting data 114 a first entry associated with the handover account and the payment event. The payment processing service 106 may send the accounting service 107 a message to add the first entry to the accounting data. In some scenarios a plurality of accounting entries may be added to the accounting data 114 to satisfy the accounting rule.

The payment processing service 106 may send to the ordering service 104 handover information indicating the handover account and the payment event. The ordering service 104 may process the handover information. The ordering service 104 may apply business rules, accounting rules, event processing and/or like based on the handover information. The business rules, accounting rules, event processing and/or like may trigger generation of a second entry. The second entry may be associated with the handover account and the payment event. The ordering service 104 may send a message to the accounting service 107 to add the second entry to the accounting data 114. The second entry may be added with one or more other accounting entries sent by the ordering service 104, such as an entry indicating revenue for the ordering service 104.

The first entry and the second entry may reconcile with each other, sum to zero, and/or cancel each other out. The first entry may indicate a credit to the handover account. The second entry may indicate a debit to the handover account. The handover account may facilitate satisfying accounting rules for payment events without the ordering service having to manage satisfaction of the accounting rules.

Figure 2A:
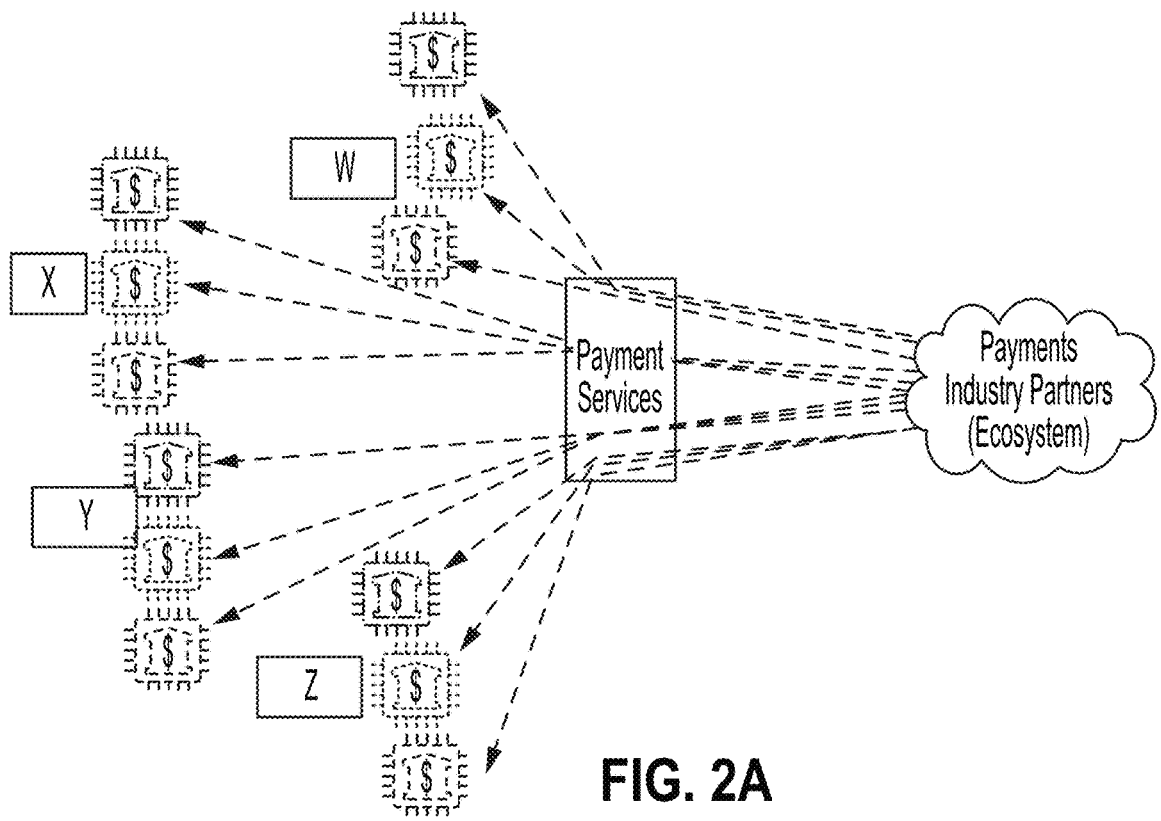
FIG. 2A is a diagram showing an example of processing events for a plurality of entities.
Figure 2B:
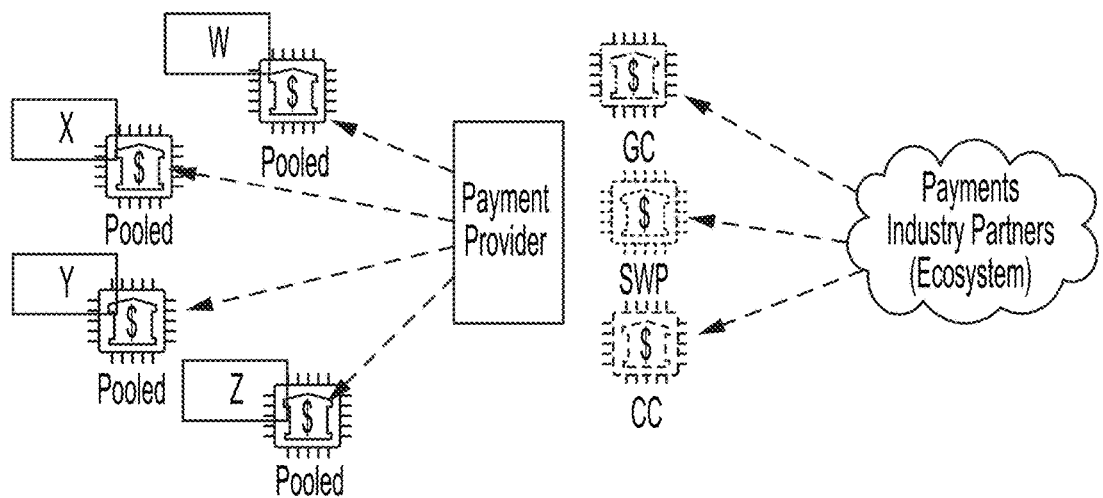
FIG. 2B is another diagram processing events for a plurality of entities.

FIGS. 2A-B are diagrams showing example processes for processing events. The disclosed techniques allow for the simplification of payment method complexity away from ordering services when it comes to payment specific accounting. A plurality of ordering services that use a multi-tenant event processing system may each have their own unique accounting mapping and changes requiring extensive testing and validation separately for each tenant. The entity specific mappings are cumbersome to maintain in an industry with evolving payment options (e.g., payment methods). These entity specific mappings for each payment option may be replaced and improved using the disclosed techniques to group each payment option to a set of accounting mapping based on when a payment (e.g., cash, funds) is received/guaranteed.

As shown in FIG. 2A, a payment may involve two sides, one shown on the left and one shown on the right. A complex scenario is shown, such as M=4 ordering services (W, X, Y, Z) and N=3 payment options (gift card, credit card, loyalty points). The payment processor (e.g., the Payment Services) does not act as a complete/licensed payment processor and instead only provides a technical service (e.g., a computing/processing service) for facilitating transactions between ordering services and clients. This scenario implies that each ordering service (e.g., which may be a separate business, separate entity) must establish individual bank accounts for each type of payment option (e.g., payment method). The ordering service's accounts may directly receive Cash, and process Remittances per payment option, including the complexity of varying fees and fee types.

In contrast. FIG. 2B shows a scenario in which a payment provider receives payments and then remit the payments to a single account of the ordering service. The payment provider in FIG. 2B has a plurality of different payment accounts (e.g., or payment options), such as credit card account (CC), systematic withdrawal plan account (SWP or loyalty points), and a gift card account (GC). The scenario shown in FIG. 2B allows for the payment provider to perform funds pooling. The payment provider may disburse funds to clients uniformly, independent of the payment method mix used to fund the transactions. This requires the payment provider to be a regulated payment provider, a model which intrinsically simplifies the accounting of their clients. This scenario, however, may not be able to be implemented in some circumstances, such as when a payment processor is not a business entity or is otherwise not able to have accounts for receiving payments. The disclosed techniques, however, allow for a technical provider, such as the payment services of FIG. 2A to provide a service that appears in function to operate like the system in FIG. 2B, while still satisfying legal and accounting requirements.

Figure 3A:
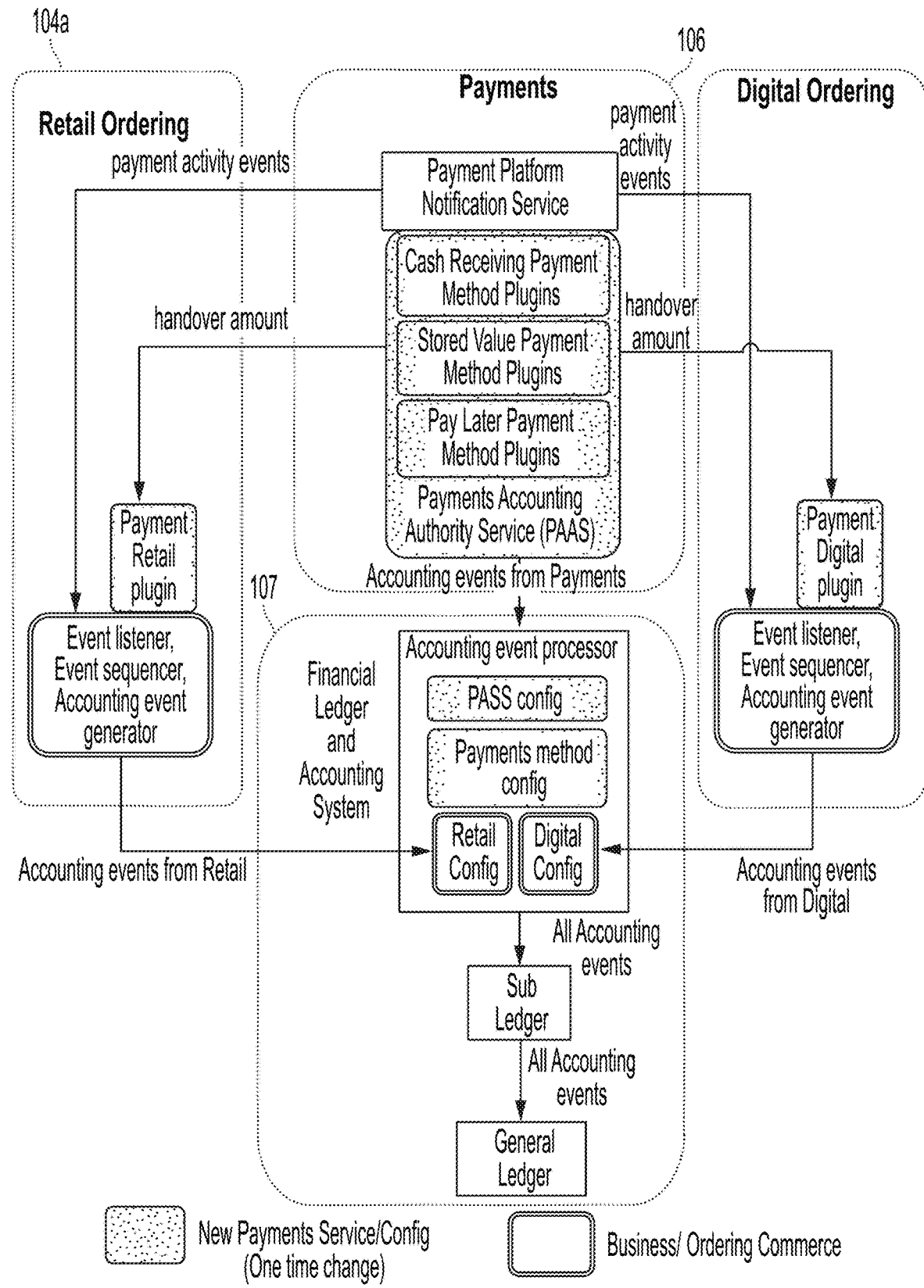
FIG. 3A is a diagram showing details of a service for processing events for a plurality of entities.

FIG. 3A is a diagram showing an example process for use in connection with the disclosed methods. This example is for explanatory purposes only and is otherwise a non-limiting example. The process may comprise a computer implemented process for processing events. A system and/or computing environment, such as the systems of FIG. 1, may be configured to perform the process. The process may comprise the payment processing service 106 (e.g., payments), one or more ordering services 104 (e.g., a retail ordering service 104*a*, a digital ordering service 104*b*), and the accounting service 107 (e.g., financial ledger and accounting system) of FIG. 1.

The payment processing service 106 may comprise a Payment Platform Notification Service and Payments Accounting Authority Service (PAAS). The PAAS may comprise one or more plugins, such as Cash Receiving Payment Method Plugins. Stored Value Payment Method Plugins. and Pay Later Payment Method Plugins. The one or more plugins may comprise computer readable code that implements specific accounting rules associated with a specific payment option. The one or more plugins may be updated and/or added as new payment options become available to allow implementation of accounting rules related to the new payment method. Payment Platform Notification Service may comprise a service responsible for sending financially significant events generated by payments to the one or more ordering services.

The PAAS may be a service responsible for booking all financially significant events for payments. The Cash Receiving Payment Method plugins are configured to receive requests from the payment processor service 106 related to cash payments to generate accounting events (e.g., or payment events) to be posted to an accounting event processor. The Stored Value Payment Method plugins are configured to receive requests from the payment processor service 106 related to stored value payments to generate accounting events (e.g., or payment events) to be posted to an accounting event processor. The Pay Later Payment Method plugins are configured to receive requests from the payment processor service 106 related to pay later payments to generate accounting events (e.g., or payment events) to be posted to an accounting event processor.

The one or more ordering services 104*a,b* may each comprise a corresponding plugin. A plugin of the one or more ordering services 104*a,b* may communicate with corresponding plugins of the PAAS. The retail ordering service 104 may comprise a Payment Retail plugin, which may be a plugin service that is triggered by all financially significant events in the retail ordering service 104a to call payments accounting APIs (e.g., the PAAS). The digital ordering service 104b may comprise Payment Digital plugin, which may be a plugin service that is triggered by all financially significant events in digital ordering service 104b to call payments accounting APIs (e.g., the PAAS).

The one or more ordering services 104a,b may each comprise an event listener. The event listener may be a service that subscribes to financially significant events from the payment processing service 106. The one or more ordering services 104a,b may each comprise an event sequencer. The event sequencer may store and compare the sequence of payment confirmation event and fulfilment events to determine a pre-payment (e.g., Settle Confirmation event happens before fulfilment event) scenario or post-payment scenario (e.g., fulfilment event happens before Settle Confirmation event). The one or more ordering services 104a,b may each comprise an accounting event generator. The accounting event generating may be service that is triggered by the event sequencer to generate accounting events for the one or more ordering services 104a,b.

The accounting service 107 (e.g., Financial Ledger and Accounting Systems Hub) may be a distributed system that powers financial integration for reporting by the one or more ordering services 104a,b to a general ledger. The accounting service 107 may comprise a rule-based configuration store and processing engine (e.g., accounting event processor) which translates business events into accounting ledger bookings. The system may handle accounting significant events. The accounting significant events may be the ultimate source to trigger accounting booking (e.g., financial reporting) in accounting agents. For example, an accounting significant event may include a settle confirmation event, last touch event, ship complete event, cash receipt event, remittance file event, return event, refund confirmation event, cash withdraw event, payment to seller event, and/or the like.

The accounting service 107 may comprise a PAAS config. The PAAS config may comprise accounting event processor config rules used by the payment processing service 106 to translate input accounting events into accounting ledger bookings. The accounting service 107 may comprise a payment method config. The payment method config may comprise accounting event processor config rules used by payment option to translate input accounting events into accounting ledger bookings. The accounting service 107 may comprise a retail config. The retail config may comprise accounting event processor config rules used by the retail ordering service 104a (e.g., Retail businesses) to translate input accounting events into accounting ledger bookings. The accounting service 107 may comprise a digital config. The digital config may comprise accounting event processor config rules used by the digital ordering service 104a (e.g., digital businesses) to translate input accounting events into accounting ledger bookings.

The accounting service 107 may comprise a sub-ledger. The sub-ledger may be a service that persists the details of financially-relevant events for sources and ordering services (e.g., businesses) onboarded to the accounting service 107, and is the authoritative source for transaction detail to substantiate the General Ledger. The accounting service 107 may comprise of a software system (source-to-sub-ledger) which may be used to reconcile business source events (from commerce systems) to sub-ledger.

The goal of the disclosed architecture is to simplify and standardize interactions with ordering services 104a,b (e.g., business client systems) that seek to collect consideration for goods and services provided to customers under the agreements that they manage. The simplification may be achieved at least in part via an application programming interfaces (APIs) in the Payments Accounting Authority Service (PAAS). The PAAS may provide a uniform interaction pattern for business processes that manage the acceptance of consideration for revenue-generating activities on behalf of a variety of billing systems. The PAAS may be configured such that payment option (e.g., payment method) complexity may be taken away from ordering services 104a,b when it comes to payment option specific accounting details. Because ordering services 104a,b do not have to handle payment option specific accounting details, the PAAS enables payment option expansion to different ordering services 104a,b (e.g., business entities) with zero accounting changes and zero UAT for business expansion.

The payment options (e.g., payment methods) may be categorized using a plurality of payment categories. For example, a payment option may be categorized under one of the following three basic payment categories (e.g., Payment Method Accounting Class[PMAC]) applicable to all businesses: (1) "Pull payments" capture or Cash Receiving. (2) 1st-party receivable transfer or Pay Later, and (3) Redemption of Stored Value.

(1) "Pull payments" capture or Cash Receiving: the management of 1-step and 2-step payment processing with payment providers when initiated by the payment processing service 106, and the booking of payment confirmation events that originate with the payment provider and represent the creation of a 3rd-party receivable from the payment provider, relieving the billing system's customer (e.g., the ordering service) of an obligation to remit cash. The PAAS may be configured to generate the correct processor receivable entries. The PAAS may handover the offset or the processor receivable to the billing system (or A/R subledger) to either clear a customer receivable or book customer advances, or both. Note that pre-payments may trigger transaction tax liabilities, for which the booking responsibility lies with the billing system.

(2) 1st-party receivable transfer or Pay Later: the transfer of a first-party customer account receivable from the billing system to a specialized A/R subledger system such as payment provider-managed installment payments. The PAAS facilitates the handover so that subsequent payment capture or cash application events can be routed to the subledger system that has taken responsibility for carrying the 1st-party receivable. These events do not change the financial position of the ordering services 104a,b but rather represent a transfer of balances between operational subledgers that is also reflected in accounting entries for the sake of better control, reporting, and reconciliation.

(3) Redemption of Stored Value: the acceptance of internal stored value instruments such as Gift Cards, Loyalty Points, and Product Vouchers. Acceptance of internal stored value as consideration represents the reduction of a liability to the customer in lieu of a cash transfer from the customer. The financial significance and timing of stored-value redemption is fundamentally different from cash consideration, and requires discrete interaction with the stored value system of record in order to tie the extinction of the liability to the timing of the revenue event.

Under this model, all pull payments may be handled uniformly under either the one-step or two-step capture process, regardless of the particular payment processor, card network or financial institution. PAAS may be responsible for booking all settlement confirmation events, providing a single, streamlined source-to-subledger booking path for improved timeliness and completeness control over this critical business process. PAAS books the 3rd-party receivable to the appropriate general ledger account, relieving the ordering service 104a,b of the need to be aware of such details. Instead. PAAS hands over the offset to the processor receivable (e.g., a credit) to the ordering service 104a,b via a handover account since it is the responsibility of the ordering service 104a,b to account for the credit side of the transaction with respect to the state of fulfillment obligations under a customer agreement. The ordering service 104a,b debits (e.g., clears) the handover account. The ordering service 104a,b will post credit entries to either clear a customer account receivable or create a customer advances balance, or a combination of both.

For the Pay Later or Invoicing payment methods, the ordering service 104a,b may hand off its first-party customer account receivable to a specialized A/R subledger. The same handover account may be used, except that in this case there is no change to the counter-party and there is an assumption that there is no pre-payment involved. The operation may capture the transfer of a receivable balance from one service to another, such that the transaction details in the journal entries and open match set (OMS) reports remain consistent with the operational subledgers that carry their respective balances.

Internal stored value may be treated differently due to the difference in the intrinsic nature of redeeming store credit vs. remitting cash as consideration. The ordering service 104a,b may ultimately hand over a debit to the stored value subledger system instead of booking a customer receivable (e.g., generating a customer receivable event). The timing of stored value redemption may be coupled to the timing of revenue recognition since it does not depend on any external events (e.g., as is the case for the receipt of cash). A separate handover account may be used for stored-value redemption since it represents a reduction in liabilities and will roll up to the same balance sheet caption.

To support payments re-architecture program, payment-specific accounting may implement the following tenets:

(1) Handover Accounts may be used by handover producers and consumers for events within their assigned Payment Method Category. Examples: Cash Receiving is inherently a Customer AR, and therefore may be an Asset Account. Stored Value is inherently a liability to deliver goods/services for amounts already received, and therefor may be a Liability Account.

(2) Handover Accounts may be utilized (e.g., only utilized) when two or more systems are required to post a single business event (e.g., Settlement) and may include both systems to generate independent accounting events. There may be no consideration for billing system specific Handover Accounts (e.g., Cash Receiving Retail Ordering System, Cash Receiving Digital Ordering System).

(3) For G/L Control Accounts (e.g., Customer Accounts Receivable or Customer Advances), the same Event Sequencer (ES) that creates a balance should be responsible for clearing the balance.

(4) Handover Accounts may be able to distinguish between ES pairs within a Handover Account. This may be required to identify between retail ordering platform (ROM), digital ordering platform (DOM) and Payments Systems (PS).

(5) Payments system design may enforce the utilization of as few handover accounts as possible. Additions of more payment categories may be challenged by the Business, Technology, and Accounting as needed. They probably should not be added to facilitate one-off solutions.

(6) All accounts may be on boarded to Source-to-subledger reporting for completeness.

Each category of payment methods may have a different handover account.

Instead of converging all system issues on three clearance accounts, explicit relationships between system pairings (e.g., Ordering and Payments) may be defined in newly created 'handover' accounts that will allow for rapid identification of issues and enforce accountability on anomaly through agreed SLA's. New clients will have a defined conduit to integrate with their desired payment options (e.g., payment methods) that will re-use established accounting rules, removing the necessity for bespoke accounting and UAT and will enable the centralization of payments Accounting controls (e.g., source-to-sub-ledger, such as from Payments to the Financial Ledger and Accounting Systems).

Table 1 shows example payment-specific accounting prior to implementation of the disclosed techniques.

TABLE 1

| Ownership | Source | Event | Company Code | General Ledger Account Number | Functional Debit | Credit |
|---|---|---|---|---|---|---|
| Business | PS/RO | @settlement success | NX | AR account | 100 | |
| Business | PS/RO | @settlement success | NX | Revenue account | | 100 |

The PS refers to payment processing service. The RO refers to retail ordering 104a. The AR account refers to an accounts receivable (AR) account. Account receivable refers to a balance of money due to an ordering service (e.g., or business) for goods or services delivered or used but not yet paid for by customers. AR is listed on the balance sheet as a current asset. AR is any amount of money owed by customers for purchases made on credit. AR is an asset account on the balance sheet that represents money due to a business in the short-term.

Table 2 shows another example payment-specific accounting using the disclosed techniques.

TABLE 2

| Ownership | Source | Event | Company Code | General Ledger Account Number | Functional Debit | Credit |
|---|---|---|---|---|---|---|
| Payments | PAAS | @settlement success | NX | AR account | 100 | |
| Payments | PAAS | @settlement success | NX | Payment handover account | | 100 |
| Business | ROM | @settlement success | NX | Payment handover account | 100 | |
| Business | ROM | @settlement success | NX | Revenue account | | 100 |

As shown in Table 2 the payment processor service 106 may add the first two entries to an accounting ledger (e.g., or table, data store). One of the entries may be associated with a payment handover account. Handover information, such as the amount of the credit and an identifier of the handover account may be sent to an ordering service (e.g., referred to as business). The ordering service 104a (e.g., referred to as ROM, or retail ordering platform/service) may process one or more accounting events using the handover information. The ordering service 104a may cause the ledger to add to one or more entries, such as an entry associated with the payment handover account.

FIG. 3B shows an example input and output type of a createAccountingBooking API in YAML format. The payment processing service 106 may be configured implement the createAccountingBooking API. It should be understood that any name may be used for the functions and properties in the API, and this is only provided for purposes of illustration.

FIG. 3C shows example accounting booking sequence information. The payment processing service 106 may be configured implement the accounting booking sequence. It should be understood that any name may be used for the functions, properties, and events shown, and this is only provided for purposes of illustration.

Figure 4:
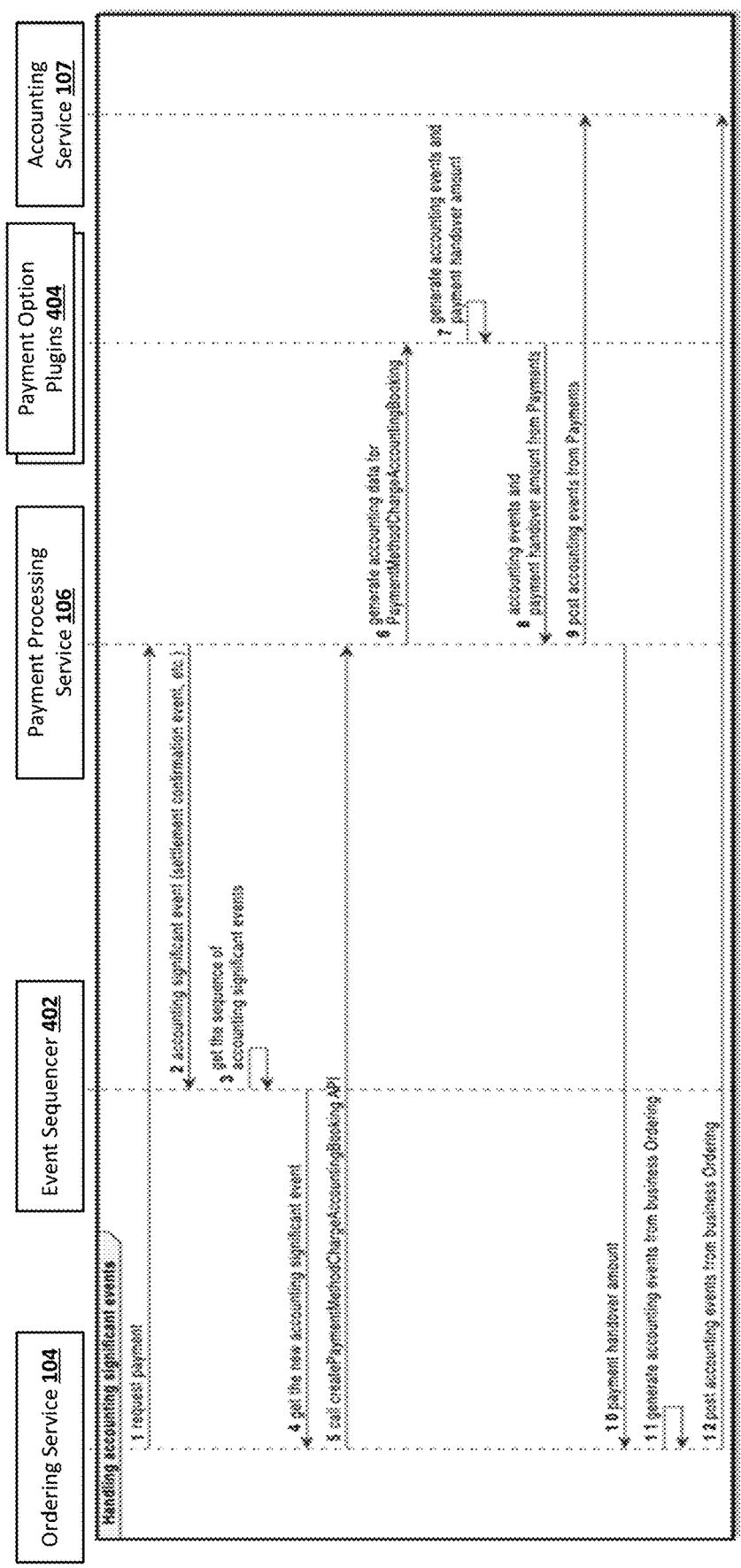
FIG. 4 is another diagram showing details of a service for processing events for a plurality of entities.

FIG. 4 is diagram showing details of a service for processing events for a plurality of ordering services. The example is for illustrative purposes and thus a non-limiting example. The figure shows a flow for an end-to-end payment confirmation accounting events process. The process comprises the ordering service 104, an event sequencer 402, the payment processing service 106, one or more payment option plugins 404, and the accounting service 107. The event sequencer 402 may be a part of the ordering service 104, and may be an event sequencer shown in FIG. 3. The one or more payment option plugins 404 may be any of the payment method plugins of FIG. 3

At step 1, the ordering service 104 sends a request to process a payment (e.g., process a payment, transaction) to the payment processing service 106.

At step 2, the payment processing service 106 sends a payment confirmation event to the event sequencer 402.

At step 3, the event sequencer 402 gets (e.g., listens for, collects) a sequence of accounting significant events. The accounting significant events may comprise payment events (e.g., payment confirmation), fulfilment events, and/or the like. The event sequencer 404 may store events and perform logic based on the ordering of various events using sequencing rules, event triggering rules, and/or the like.

At step 4, the event sequencer 402 sends a message to the ordering service 104 to get a new accounting significant event.

At step 5, the ordering service 104 sends a message (e.g., an API call) to the payment processing service 106. The message be a call to a function (e.g., createPaymentMethod-ChargeAccountingBooking) associated with payment processing (e.g., or payment/transaction processing). The call to the function may indicate that services are needed to process a payment (e.g., payment, transaction).

At step 6, the payment processing service 106 sends a message to one or more payment option plugins 404 to generate accounting data. The message may be a call to a function (e.g., PaymentMethodChargeAccountingBooking).

At step 7, the one or more payment option plugin 404 generate one or more accounting events and handover information. The handover information may comprise a handover amount, handover account identifier (e.g., pointer, unique id), or a combination thereof. The one or more payment option plugins 404 may comprise computer readable instructions and/or the like that generate payment events (e.g., accounting events) specific to the payment option (e.g., or payment method) associated with the payment. The payment events may satisfy rules, regulations, policies, requirements, and/or like associated with the payment option. One of the payment events may be a payment event associated with the handover account, such as a credit in the amount of the handover amount to add to the handover account.

At step 8, the one or more payment option plugins 404 send the one or more payment events and the payment handover amount to the payment processing service 106.

At step 9, the payment processing service 106 sends a message to the accounting service 107 to cause the one or more accounting events to be added to an accounting data store.

At step 10, the payment processing service 106 sends handover information to the ordering service 104.

At step 11, the ordering service 104 generates accounting events. The accounting events may be based on the handover information. For example, the accounting events may be an amount to debit, credit, and/or the like to the handover account. The ordering service 104 may apply rules, business logic to the ordering service, and/or the like to generate the accounting events based on the handover information.

At step 12, the ordering service 104 sends a message to the accounting service 107 to add the accounting events to the accounting data store.

Figure 5:
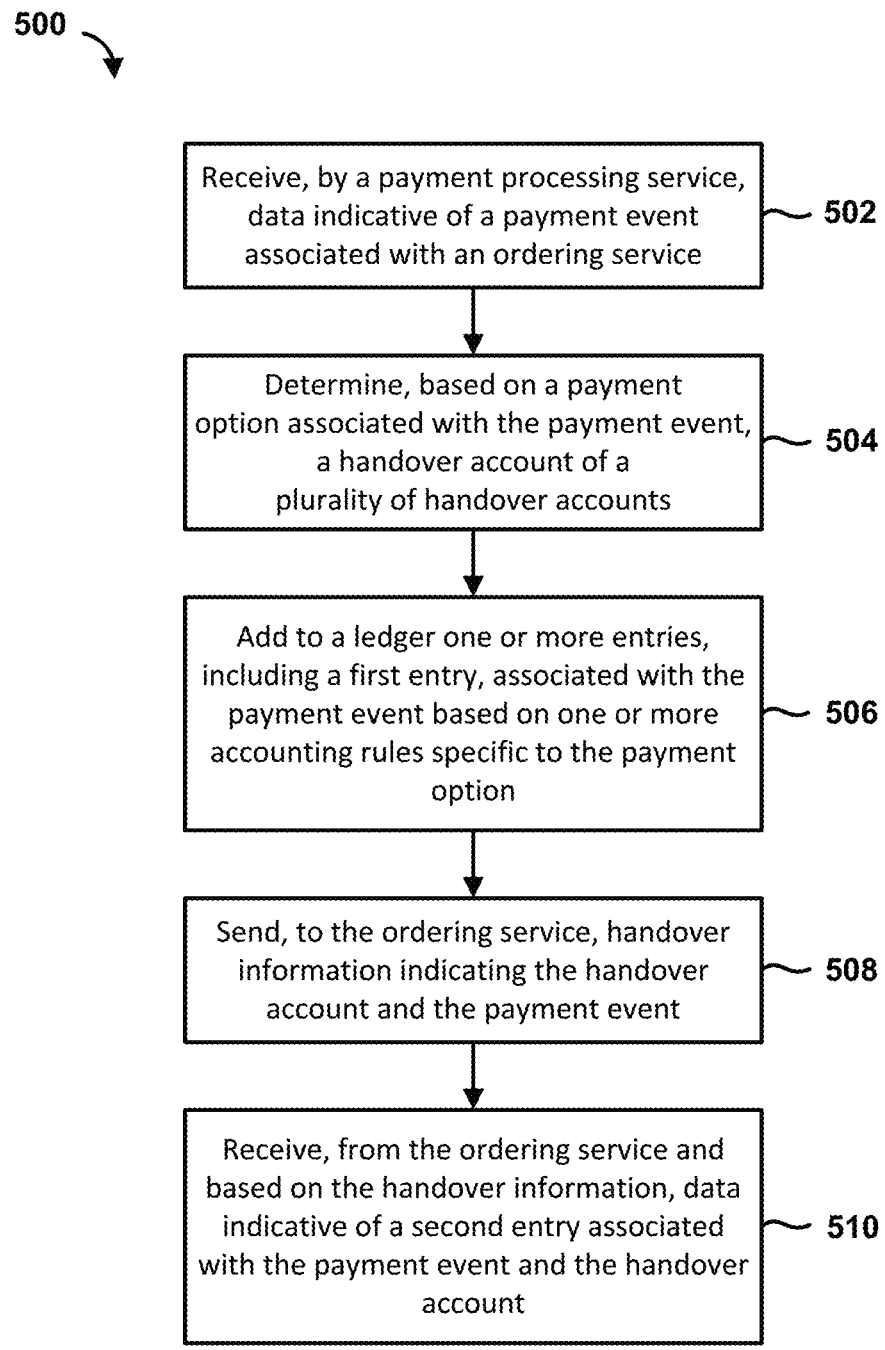
FIG. 5 is a flowchart illustrating an example of processing events.

FIG. 5 is a flowchart showing an example process 500 for use in connection with the disclosed methods. The process 500 may comprise a computer implemented process for processing events. A system and/or computing environment, such as the systems of FIGS. 1-3A, the computing environment of FIG. 7, and/or the computing system of FIG. 8 may be configured to perform the process 500.

Operation 502 depicts receiving data indicative of a payment event associated with an ordering service. The data indicative of the payment event associated with the ordering service may be received by a payment processing service. The payment processing service may provide payment processing for a plurality of ordering services. The payment processing service may facilitate payments with accounts of the plurality of ordering services without using an intermediate account to receive funds associated with payments.

The ordering service may be one of the plurality of ordering services. At least one of the plurality of ordering services may be external to the system. In some scenarios, at least a portion (or all) of the plurality of ordering services be services that are internal to the system. Each ordering service may be associated with a corresponding service entity, ordering entity, business entity, application, and/or the like.

Operation 504 depicts determining a handover account of a plurality of handover accounts. The handover account may be determined based on a payment option associated with the payment event. The handover account may be one of a plurality of handover accounts. Each handover account of the plurality of handover accounts may correspond to a payment category associated with a plurality of payment options. If the payment option associated with the payment event matches a payment option associated with a payment category, then the handover account associated with the payment category may be determined. In some scenarios, the payment options may be directly associated with handover accounts without a payment category. The plurality of handover accounts may comprise a first handover account corresponding to a cash receiving payment category, a second handover account corresponding to a pay later payment category, a third handover account corresponding to a stored value payment category, a combination thereof, and/or the like.

Operation 506 depicts adding to a ledger (e.g., accounting ledger, a data structure implementing a ledger, database, data store) one or more entries (e.g., accounting entries) associated with the payment event. The ledger may comprise entries for the plurality of ordering services.

The one or more entries may be added to the ledger based on one or more accounting rules specific to the payment option. At least one of the one or more entries may comprise a first entry associated with the handover account and the payment event. The payment processing service may access, manage, store, and/or the like a plurality of accounting rules. Each accounting rule is a logical rule in a computer readable language stored as data on one or more computing nodes. Each accounting rule may correspond with a payment option. For example, a payment option may have requirements, such as regulations, legal requirements, data requirements, and/or the like, associated with the payment option. An accounting rule may indicate specific entries to add to the data store if the payment option is used for a payment. An accounting rule may indicate specific data categories (e.g., types of information), data values (e.g., values for the categories/types of information), and/or the like to add to one or more corresponding entries in the data store.

Operation 508 depicts sending handover information indicating the handover account and the payment event. The handover information may be sent to the ordering service. The ordering service may apply business rules, accounting rules, event processing and/or like based on the handover information. The business rules, accounting rules, event processing and/or like may trigger generation of data for adding a second entry second entry and/or causing the data store to store a second entry. The second entry may be associated with the payment event and the handover account. For example, the second entry may indicate the handover account in an account field of the entry. The second entry may indicate details of the payment event one or more other fields of the entry.

Operation 510 depicts receiving data indicative of a second entry associated with the payment event and the handover account. The data indicative of the second entry may be received from the ordering service. The data indicative of the second entry may be received based on the handover information.

The handover account may facilitate satisfying accounting rules for payment events without the plurality of ordering services having to manage satisfaction of the accounting rules. The first entry and the second entry may reconcile with each other, sum to zero, and/or cancel each other out. The first entry may indicate a credit to the handover account. The second entry may indicate a debit to the handover account.

Figure 6:
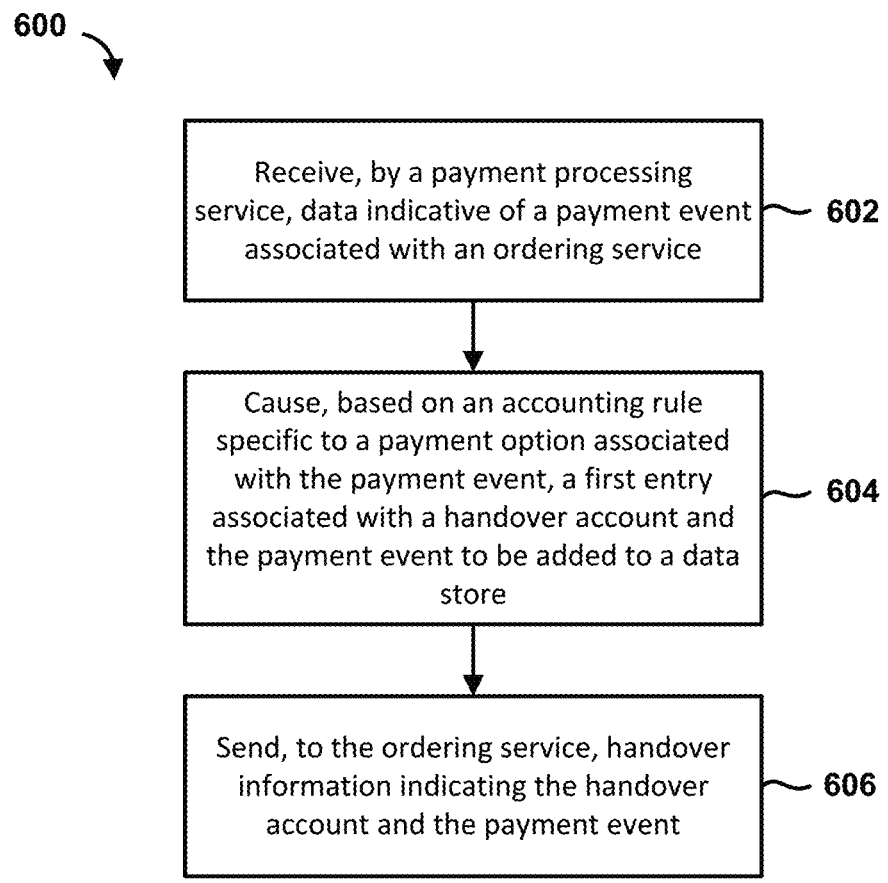
FIG. 6 is a flowchart illustrating another example of processing events.

FIG. 6 is a flowchart showing an example process 600 for use in connection with the disclosed methods. The process 600 may comprise a computer implemented process for processing events. A system and/or computing environment, such as the systems of FIGS. 1-3A, the computing environment of FIG. 7, and/or the computing system of FIG. 8 may be configured to perform the process 600.

Operation 602 depicts receiving data indicative of a payment event associated with an ordering service. The data indicative of the payment event associated with an ordering service may be received by a payment processing service. The payment processing service may provide payment processing for a plurality of ordering services. The payment processing service may facilitate payments with a plurality of accounts of the ordering service without using an intermediate account to receive funds associated with the payments.

The ordering service may be one of the plurality of ordering services. At least one of the plurality of ordering services may be external to the system. In some scenarios, at least a portion (or all) of the plurality of ordering services be services that are internal to the system. Each ordering service may be associated with a corresponding service entity, ordering entity, business entity, application, and/or the like.

Operation 604 depicts causing a first entry associated with a handover account and the payment event to be added to a data store (e.g., accounting data store). The data store may comprise entries for the plurality of ordering services. The data store may comprise a database, an accounting ledger (e.g., data structure representing a ledger), a combination thereof, and/or the like.

The first entry associated with a handover account and the payment event may be added to the data store based on an accounting rule specific to a payment option associated with the payment event. The payment processing service may access, manage, store, and/or the like a plurality of accounting rules. Each accounting rule is a logical rule in a computer readable language stored as data on one or more computing nodes. Each accounting rule may correspond with a payment option. For example, a payment option may have requirements, such as regulations, legal requirements, data requirements, and/or the like, associated with the payment option. An accounting rule may indicate specific entries to add to the data store if the payment option is used for a payment. An accounting rule may indicate specific data categories (e.g., types of information), data values (e.g., values for the categories/types of information), and/or the like to add to one or more corresponding entries in the data store.

The handover account may be one of a plurality of handover accounts. Each handover account of the plurality of handover accounts may correspond to a payment category associated with a plurality of payment options. The method may comprise determining, based on the payment option associated with the payment event, the handover account from the plurality of handover accounts. The plurality of handover accounts may comprise a first handover account corresponding to a cash receiving payment category, a second handover account corresponding to a pay later payment category, a third handover account corresponding to a stored value payment category, a combination thereof, and/or the like.

Causing the first entry associated with the handover account and the payment event to be added to the data store may comprise causing a plurality of entries (e.g., accounting entries) to be added to the data store to satisfy the accounting rule. Causing the first entry associated with the handover account and the payment event to be added to the data store may be based on a determination of an order of the payment event and a fulfilment event associated with the payment event.

Operation 606 depicts sending handover information indicating the handover account and the accounting event. The handover information indicating the handover account and the payment event may be sent to the ordering service. The ordering service may cause, based on the handover information, a second entry associated with the handover account and the payment event to be added to the data store. The ordering service may apply business rules, accounting rules, event processing and/or like based on the handover information. The business rules, accounting rules, event processing and/or like may trigger generation of the second entry and/or causing the data store to store the second entry.

The handover account may facilitate satisfying accounting rules for payment events without the ordering service having to manage satisfaction of the accounting rules. The first entry and the second entry may reconcile with each other, sum to zero, and/or cancel each other out. The first entry may indicate a credit to the handover account. The second entry may indicate a debit to the handover account.

FIG. 7 is a diagram schematically illustrating an example of a data center 710) that can provide computing resources to users 700a and 700b (which may be referred herein singularly as user 700 or in the plural as users 700) via user computers 702a and 702b (which may be referred herein singularly as computer 702 or in the plural as computers 702) via a communications network 730. Data center 710 may be configured to provide computing resources for executing applications on a permanent or an as-needed basis. The computing resources provided by data center 710 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, event services, payment processing services, accounting services, and the like. These web services may be configurable with set or custom applications and may be configurable in size, execution, cost, latency, type, duration, accessibility, and in any other dimension. These web services may be configured as available infrastructure for one or more clients and can include one or more applications configured as a service or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 710 may include servers 716a-b (which may be referred herein singularly as server 716 or in the plural as servers 716) that provide computing resources. These resources may be available as bare metal resources, or as virtual machine instances 718a-d and (which may be referred herein singularly as virtual machine instance 718 or in the plural as virtual machine instances 718). Virtual machine instances 718c and 718d are payment processing service virtual machine instances. The payment processing service virtual machine instances 718c and 718d may be configured to perform all or any portion of the payment, payment, accounting, event processing, and/or the like techniques in accordance with the present disclosure and described in detail herein. As should be appreciated, while the particular example illustrated in FIG. 7 includes one payment processing service virtual machine in each server, this is merely an example. A server may include more than one payment processing service virtual machine or may not include any payment processing service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 7, communications network 730 may, for example, be a publicly accessible network of linked networks and possibly operated by various distinct parties, such as the Internet. In other embodiments, communications network 730 may be a private network, such as, a corporate or university network that is wholly or partially inaccessible to non-privileged users. In still other embodiments, communications network 730 may include one or more private networks with access to and/or from the Internet.

Communication network 730 may provide access to computers 702. User computers 702 may be computers utilized by users 700 or other customers of data center 710. For instance, user computer 702a or 702b may be a server, a desktop or laptop personal computer, a tablet computer, a wireless telephone, a personal digital assistant (PDA), an e-book reader, a game console, a set-top box or any other computing device capable of accessing data center 710. User computer 702a or 702b may connect directly to the Internet (e.g., via a cable modem or a Digital Subscriber Line (DSL)). Although only two user computers 702a and 702b are depicted, it should be appreciated that there may be multiple user computers.

User computers 702 may also be utilized to configure aspects of the computing resources provided by data center 710. In this regard, data center 710 might provide a gateway or web interface through which aspects of its operation may be configured through the use of a web browser application program executing on user computer 702. Alternately, a stand-alone application program executing on user computer 702 might access an application programming interface (API) exposed by data center 710 for performing the configuration operations. Other mechanisms for configuring the operation of various web services available at data center 710 might also be utilized.

Servers 716 shown in FIG. 7 may be standard servers configured appropriately for providing the computing resources described above and may provide computing resources for executing one or more web services and/or applications. In one embodiment, the computing resources may be virtual machine instances 718. In the example of virtual machine instances, each of the servers 716 may be configured to execute an instance manager 720*a* or 720*b* (which may be referred herein singularly as instance manager 720 or in the plural as instance managers 720) capable of executing the virtual machine instances 718. The instance managers 720 may be a virtual machine monitor (VMM) or another type of program configured to enable the execution of virtual machine instances 718 on server 716, for example. As discussed above, each of the virtual machine instances 718 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 710 shown in FIG. 7, a router 714 may be utilized to interconnect the servers 716*a* and 716*b*. Router 714 may also be connected to gateway 740, which is connected to communications network 730. Router 714 may be connected to one or more load balancers, and alone or in combination may manage communications within networks in data center 710, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 710 shown in FIG. 7, a server manager 715 is also employed to at least in part direct various communications to, from and/or between servers 716*a* and 716*b*. While FIG. 7 depicts router 714 positioned between gateway 740 and server manager 715, this is merely an exemplary configuration. In some cases, for example, server manager 715 may be positioned between gateway 740 and router 714. Server manager 715 may, in some cases, examine portions of incoming communications from user computers 702 to determine one or more appropriate servers 716 to receive and/or process the incoming communications. Server manager 715 may determine appropriate servers to receive and/or process the incoming communications based on factors such as an identity, location or other attributes associated with user computers 702, a nature of a task with which the communications are associated, a priority of a task with which the communications are associated, a duration of a task with which the communications are associated, a size and/or estimated resource usage of a task with which the communications are associated and many other factors. Server manager 715 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 710 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
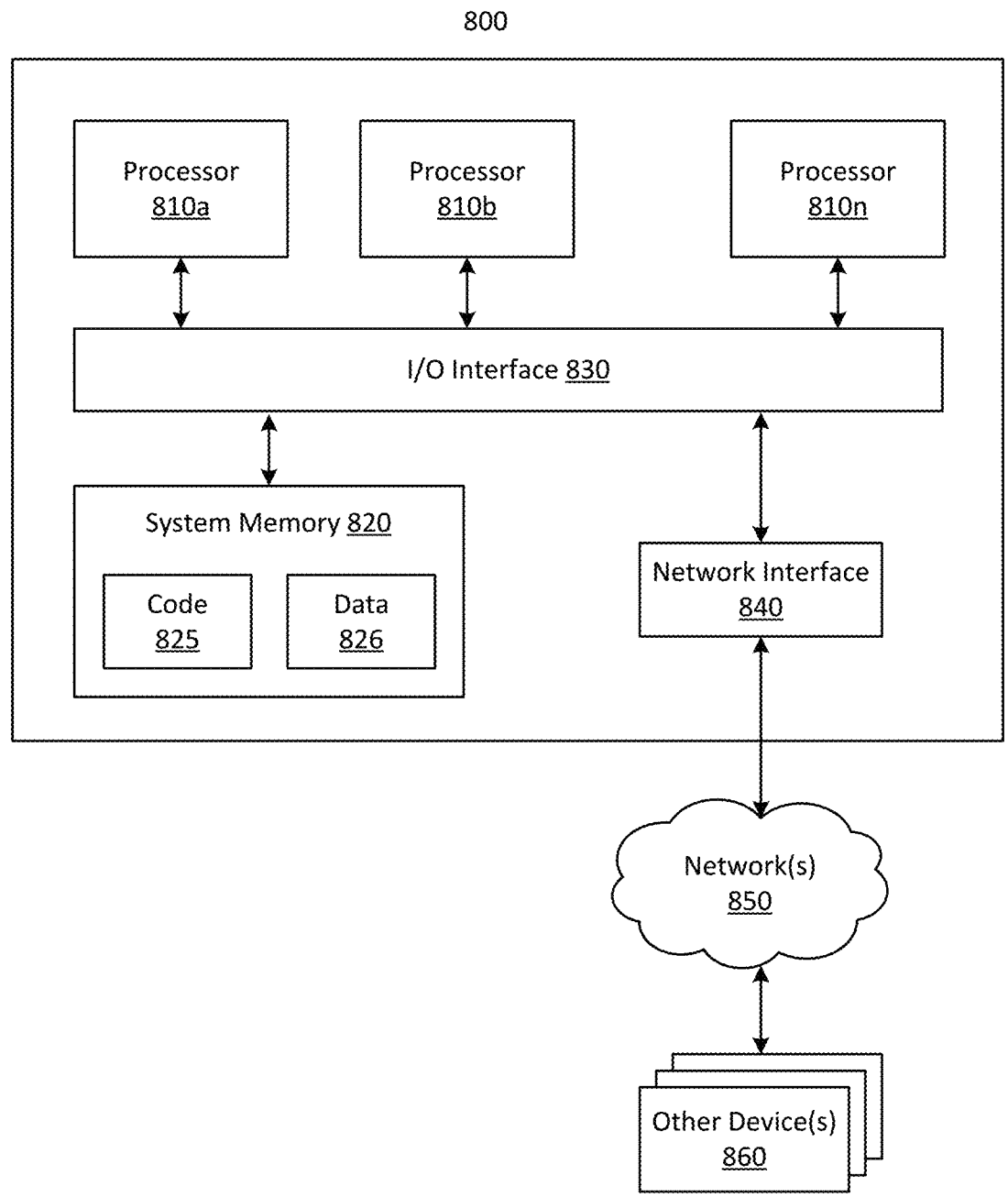
FIG. 8 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. The example computer system of FIG. 8 may be configured to implement one or more of the computing service 102, the ordering service 104, the payment processing service 106, the accounting service 107, the storage service 108, the user device 110, or a combination thereof of FIGS. 1-3A, and 4. The example computer system of FIG. 8 may be configured to implement any of the methods described herein, such as any methods (e.g., or any operations) associated with FIGS. 1-6.

In the illustrated embodiment, computing device 800 includes one or more processors 810*a*. 810*b* and/or 810*n* (which may be referred herein singularly as "a processor 810" or in the plural as "the processors 810") coupled to a system memory 820 via an input/output (I/O) interface 830. Computing device 8100 further includes a network interface 840 coupled to I/O interface 830.

In various embodiments, computing device 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/FlashR-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between processor 810, system memory 820 and any peripherals in the device, including network interface 840) or other peripheral interfaces. In some embodiments, I/O interface 830) may perform any necessary protocol, timing or other data transformations to convert data signals from one component (e.g., system memory 820) into a format suitable for use by another component (e.g., processor 810). In some embodiments. I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840) may support communication via telecommunications/telephony networks such as analog voice networks or digital fiber communications networks, via storage area networks such as Fibre Channel SANs (storage area networks) or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 830. A non-transitory computer-accessible storage medium may also include any volatile or non-volatile media such as RAM (e.g. SDRAM. DDR SDRAM. RDRAM. SRAM, etc.). ROM (read only memory) etc., that may be included in some embodiments of computing device 800 as system memory 820 or another type of memory. Further, a computer-accessible medium may include transmission media or signals such as electrical, electromagnetic or digital signals conveyed via a communication medium such as a network and/or a wireless link, such as those that may be implemented via network interface 840. Portions or all of multiple computing devices such as those illustrated in FIG. 8 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device." as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances. Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising one or more memories having instructions thereon that, upon execution by one or more processors of the system, at least cause the system to:
   receive, by a payment processing service, data indicative of a payment event associated with one of a plurality of ordering services;
   determine, based on a payment option associated with the payment event, a handover account of a plurality of handover accounts, wherein each handover account corresponds to a payment category associated with a plurality of payment options;
   add to a ledger one or more entries associated with the payment event based on one or more accounting rules specific to the payment option, wherein the ledger comprises entries for the plurality of ordering services and at least one of the one or more entries comprises a first entry associated with the handover account and the payment event;
   send, to the ordering service, handover information indicating the handover account and the payment event; and
   receive, from the ordering service and based on the handover information, data indicative of a second entry associated with the payment event and the handover account,
   wherein the handover account facilitates satisfying accounting rules for accounting events.

2. The system of claim 1, wherein the payment processing service facilitates payments with accounts of the plurality of ordering services without using an intermediate account to receive funds associated with payments.

3. The system of claim 1, wherein the first entry indicates a credit to the handover account and the second entry indicates a debit to the handover account.

4. The system of claim 1, wherein the plurality of handover accounts comprises a first handover account corresponding to a cash receiving payment category, a second handover account corresponding to a pay later payment category, and a third handover account corresponding to a stored value payment category.

5. The system of claim 1, wherein at least one of the plurality of ordering services are external to the system.

6. A computer implemented method, the method comprising:
   receiving, by a payment processing service, data indicative of a payment event associated with an ordering service;
   determining, based on a payment option associated with the payment event, a handover account from a plurality of handover accounts, wherein each handover account of the plurality of handover accounts corresponds to a payment category associated with a plurality of payment options;
   causing, based on an accounting rule specific to the payment option associated with the payment event, a first entry associated with the handover account and the payment event to be added to a data store; and
   sending, to the ordering service, handover information indicating the handover account and the payment event, wherein the ordering service causes, based on the handover information, a second entry associated with the handover account and the payment event to be added to the data store, and
   wherein the handover account facilitates satisfying accounting rules for payment events.

7. The method of claim 6, wherein the payment processing service facilitates payments with a plurality of accounts of the ordering service without using an intermediate account to receive funds associated with the payments.

8. The method of claim 6, wherein the first entry indicates a credit to the handover account and the second entry indicates a debit to the handover account.

9. The method of claim 6, wherein the plurality of handover accounts comprises a first handover account corresponding to a cash receiving payment category, a second handover account corresponding to a pay later payment category, and a third handover account corresponding to a stored value payment category.

10. The method of claim 6, wherein the ordering service is one of a plurality of ordering services and at least one of the plurality of ordering services are external to a system implementing the payment processing service.

11. The method of claim 6, wherein causing the first entry associated with the handover account and the payment event to be added to the data store comprises causing a plurality of entries to be added to the data store to satisfy the accounting rule.

12. The method of claim 6, wherein causing the first entry associated with the handover account and the payment event to be added to the data store is based on a determination of an order of the payment event and a fulfilment event associated with the payment event.

13. The method of claim 6, wherein the payment processing service provides payment processing for a plurality of ordering services, and wherein the data store comprises entries for the plurality of ordering services.

14. A non-transitory computer-readable storage medium having stored thereon computer-readable instructions, the computer-readable instructions comprising instructions that, upon execution on one or more computing devices, at least cause:
   receiving, by a payment processing service, data indicative of a payment event associated with an ordering service;
   determining, based on a payment option associated with the payment event, a handover account from a plurality of handover accounts, wherein each handover account of the plurality of handover accounts corresponds to a payment category associated with a plurality of payment options;
   causing, based on an accounting rule specific to the payment option associated with the payment event, a first entry associated with the handover account and the payment event to be added to a data store; and
   sending, to the ordering service, handover information indicating the handover account and the payment event, wherein the ordering service causes, based on the handover information, a second entry associated with the handover account and the payment event to be added to the data store, and wherein the handover account facilitates satisfying accounting rules for payment events.

15. The non-transitory computer-readable storage medium of claim 14, wherein the payment processing service facilitates payments with a plurality of accounts of the ordering service without using an intermediate account to receive funds associated with the payments.

16. The non-transitory computer-readable storage medium of claim 14, wherein the first entry indicates a credit to the handover account and the second entry indicates a debit to the handover account.

17. The non-transitory computer-readable storage medium of claim 14, wherein the plurality of handover accounts comprise a first handover account corresponding to a cash receiving payment category, a second handover account corresponding to a pay later payment category, and at third handover account corresponding to a stored value payment category.

18. The non-transitory computer-readable storage medium of claim 14, wherein the ordering service is one of a plurality of ordering services managed by one or more corresponding business entities.

* * * * *